July 6, 1954  V. F. BOZEMAN, SR., ET AL  2,682,739
LIFTING WHEEL FOR BEET HARVESTERS
Filed Sept. 2, 1950  5 Sheets-Sheet 1

INVENTORS.
VIRGIL F. BOZEMAN, SR. KNUD B. SORENSEN
HOWARD F. CLAUSEN
BY
ATTORNEYS

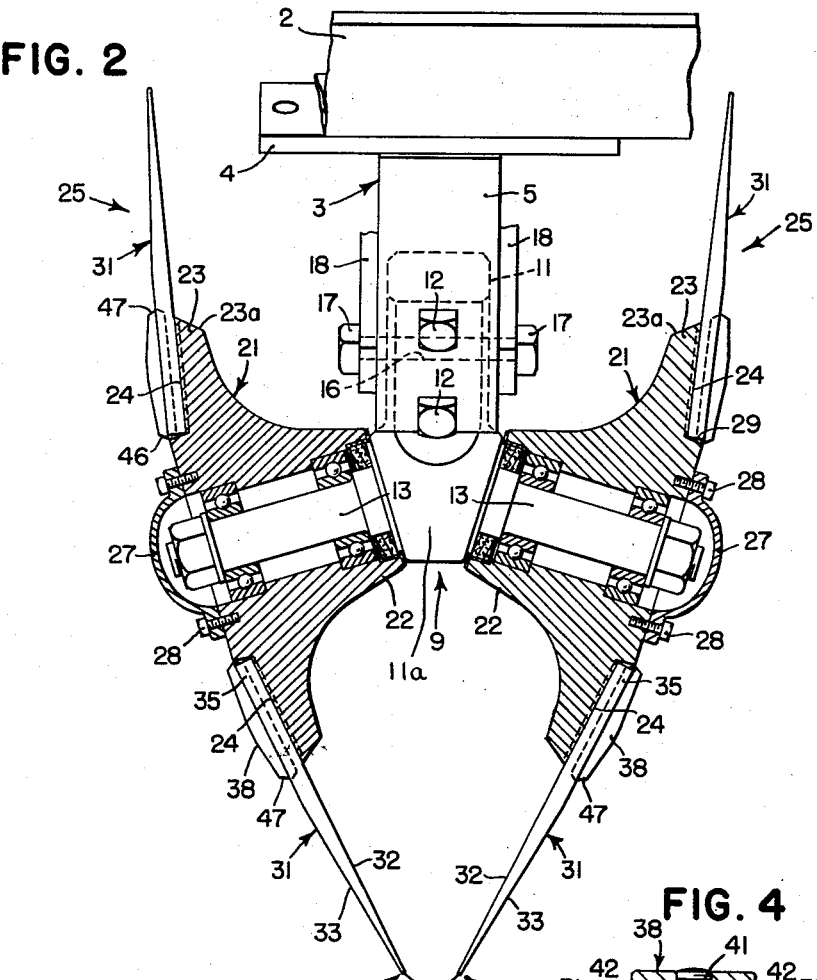
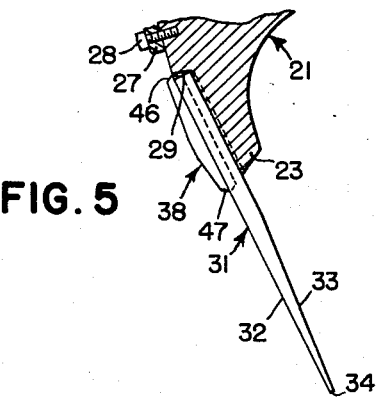
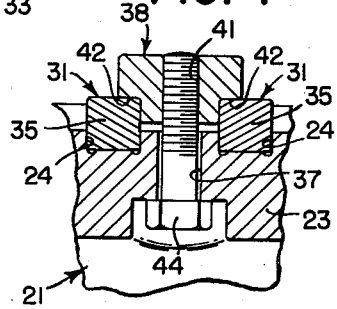

July 6, 1954   V. F. BOZEMAN, SR., ET AL   2,682,739
LIFTING WHEEL FOR BEET HARVESTERS
Filed Sept. 2, 1950   5 Sheets-Sheet 3

INVENTORS
VIRGIL F. BOZEMAN SR.
KNUD B. SORENSEN
HOWARD F. CLAUSEN

ATTORNEYS

July 6, 1954  V. F. BOZEMAN, SR., ET AL  2,682,739
LIFTING WHEEL FOR BEET HARVESTERS Filed Sept. 2, 1950　　　　　　　　　　　　　　　　5 Sheets-Sheet 4

INVENTORS.
VIRGIL F. BOZEMAN, SR., KNUD B. SORENSEN
HOWARD F. CLAUSEN
BY
ATTORNEYS

Patented July 6, 1954

2,682,739

UNITED STATES PATENT OFFICE 2,682,739

LIFTING WHEEL FOR BEET HARVESTERS

Virgil F. Bozeman, Sr., Moline, Ill., Knud B. Sorensen, Bettendorf, Iowa, and Howard F. Clausen, Moline, Ill., assignors to Deere & Company, Moline, Ill., a corporation of Illinois Application September 2, 1950, Serial No. 183,022

12 Claims. (Cl. 55—108)

The present invention relates generally to beet harvesters and the like and is more particularly concerned with new and improved means for lifting beets from the ground after the beet tops have been removed by a previous topping operation.

The object and general nature of the present invention is the provision of new and improved beet-lifting means, preferably in the nature of a pair of toothed rotatable wheels having a plurality of generally radially extending teeth, so arranged and angled, and the axes of rotation of the two wheels so disposed, that during the forward travel of the machine, the teeth initially enter the ground with practically no laterally outwardly directed pressure against the soil and, in addition, with only a relatively small amount of laterally inwardly directed pressure against the soil until the teeth reach a position approximately at their deepest penetration, after which the teeth move laterally inwardly toward one another with relatively accelerated movement so as to exert an appreciable amount of laterally inwardly directed pressure against the soil, which tends to cause the beets to move upwardly and out of the soil as the wheels roll forwardly. Specifically, the teeth start to move in toward one another, almost from the moment they enter the ground, but this movement is slow at first but progressively increases at an accelerated rate, so that the laterally inwardly directed pressure applied against the soil from opposite sides of the beets acts to break the beet, including the tail or root portion, loose from the soil, even before the teeth reach their lowest point of soil penetration. Then when the teeth start upwardly the beet is elevated but the tail portion remains intact and is not broken off. During this time the soil between the teeth, especially during the latter part of their movement through the ground, is broken up into relatively small clods.

Further, it is an important feature of this invention to provide teeth which are reversible in the associated wheel hubs, so as to vary the angle at which the teeth act against the soil during the soil-pushing and beet-lifting range of their movement, varying the angle between the teeth at this time serving to condition the machine for operating either in soil that is excessively dry or in soil that is excessively moist.

Additionally, it is a further object of this invention to provide a beet-lifting wheel in which the teeth which enter the ground and perform the lifting action have outer chisel-like or spade-like ends that are substantially straight in a circumferential direction, whereby the soil squeezing or lifting actions of the teeth are effective for a distance throughout substantially the entire length of the teeth, particularly at the radially outer end portions thereof.

A further feature of this invention is the provision of an improved form of beet-engaging tooth for beet lifters of the above described construction, whereby there is little tendency for soil to build up against or bridge across the teeth of the lifting wheel. It is also a feature of this invention to provide new and improved tooth clamping means having a wedging action whereby there is provided an increased clamping strength.

Another feature of this invention is the provision of a removable shoulder or abutment band adapted to be carried by the lifting wheel to facilitate breaking up and disintegrating clods and the like, which sometimes appear, especially under extremely dry conditions. Preferably, the band is attached to the wheel by the means that clamps the lifting teeth thereto.

These and other objects and advantages of the present invention will be apparent to those skilled in the art after a consideration of the following detailed description, taken in conjunction with the accompanying drawings, in which Figure 1 is a side view, partly in section, of a portion of a beet harvester carrying beet-lifting wheels in which the principles of the present invention have been incorporated, the direction of forward travel of the harvester being to the right as viewed in this figure.

Figure 2 is a sectional view taken generally along the line 2—2 of Figure 1, which section lies in a transverse plane that makes an acute angle of about 60° with respect to the longitudinal horizontal plane of the harvester and passes through the wheels at the points of minimum and maximum spacing between the teeth, portions of the adjacent frame members and wheel supporting shank or standard being shown as they would appear in a section taken on a plane parallel to the transverse plane of the line 2—2 and in front of the shank or standard.

Figure 4 is an enlarged sectional view taken along the line 4—4 of Figure 3.

Figure 5 is a fragmentary sectional view showing the position of the teeth when reversed, Figure 5 being similar to Figure 2 so far as the plane of the section is concerned.

Figure 1:
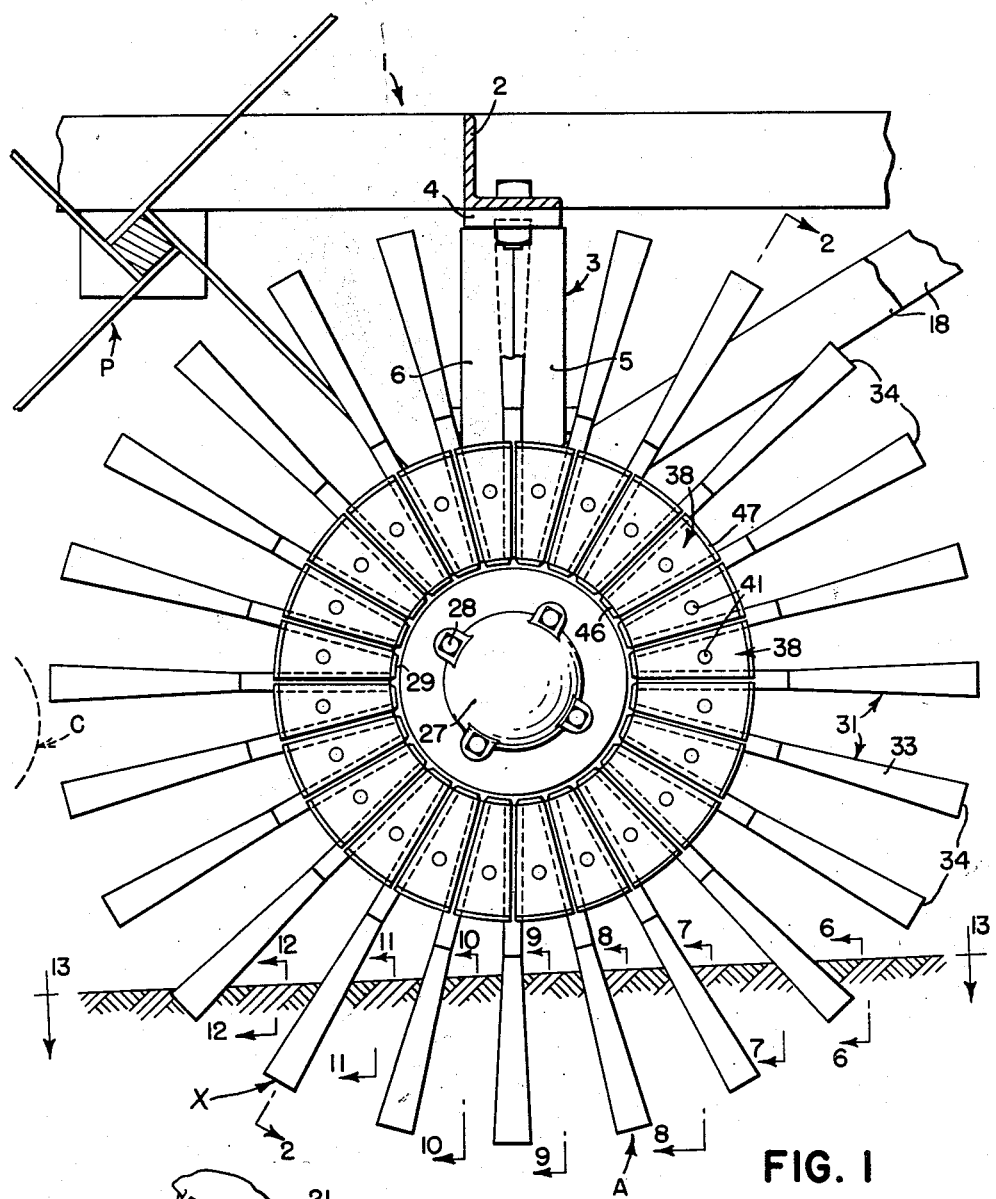

Figures 6–12, inclusive, are fragmentary vertical sectional views, taken generally along the lines 6—6, 7—7, etc., of Figure 1 and show the various positions each tooth takes during its passage through the ground.

Figure 13:
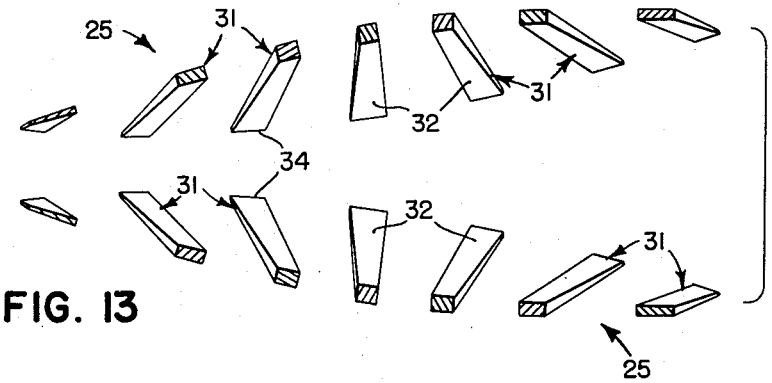

Figure 13 is a view of the ground-entering portions of the beet-lifting wheels, showing the outer ends of the teeth in the positions they occupy when the wheels are in the position shown in Figure 1, Figure 13 corresponding to a view taken along the line 13—13 of Figure 1, with the soil, normally surrounding the ground-entering portions of the teeth, removed.

Figure 14:
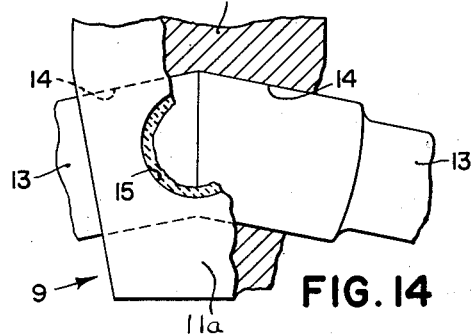

Figure 14 is an enlarged fragmentary detail, partly in section, of the wheel spindles.

Figure 15:
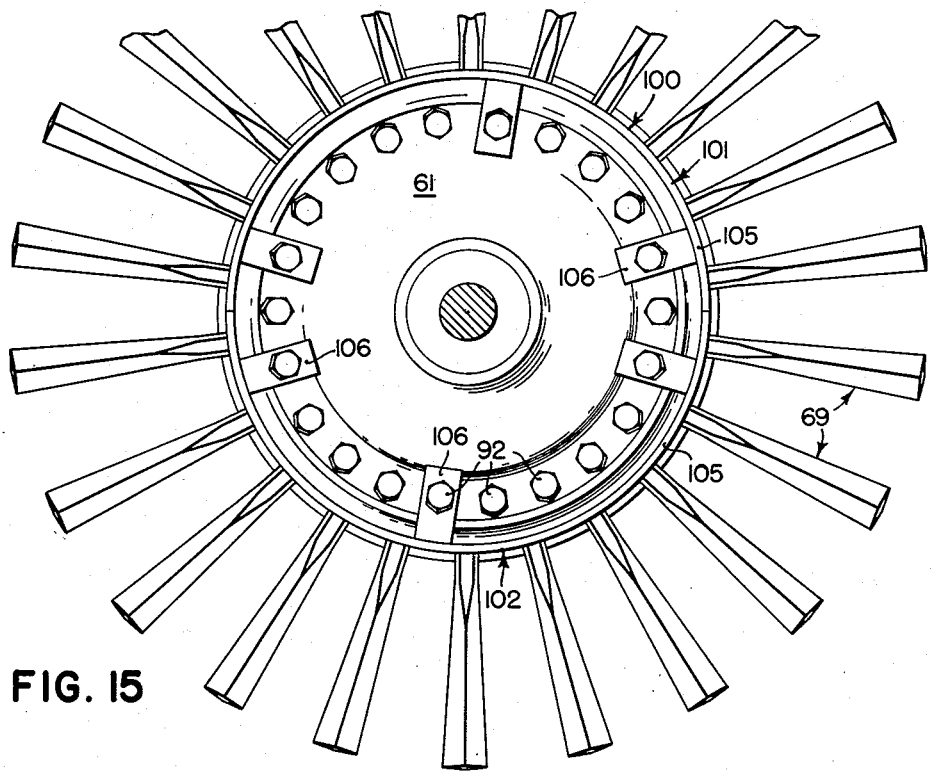

Figure 15 is an enlarged side view, somewhat similar to Figure 1, showing the inner side of a modified form of beet lifting wheel and associated tooth structure.

Figure 16:
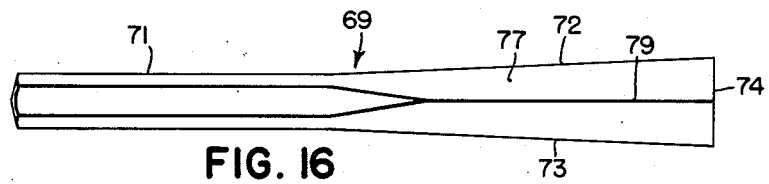

Figure 16 is a side view of one of the teeth employed in the form of the invention shown in Figure 15.

Figure 17:
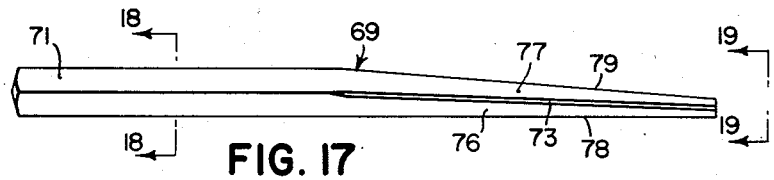

Figure 17 is an edge view of the tooth shown in Figure 16.

Figure 18:

Figure 18 is a sectional view taken along the plane of the line 18—18 of Figure 17.

Figure 19:

Figure 19 is an end view of the tooth, taken along the line 19—19 of Figure 17.

Figure 20:
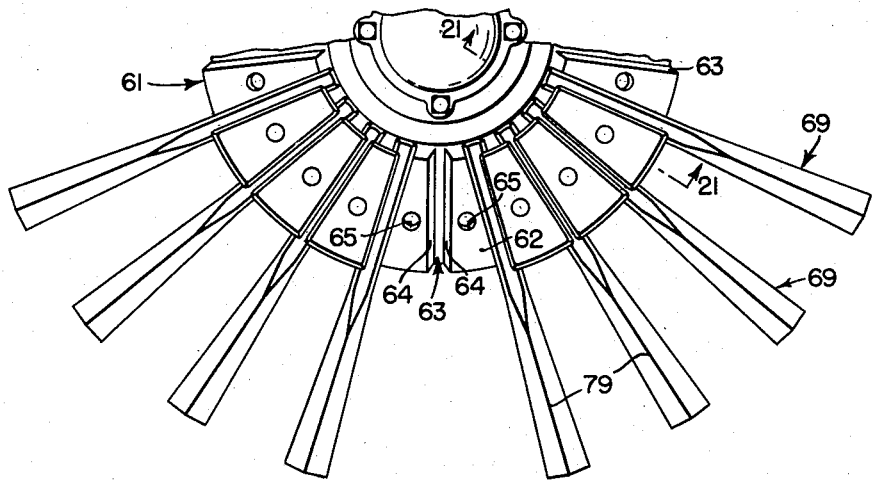

Figure 20 is a fragmentary elevation, showing the tooth clamping means employed in this form of the invention.

Figure 21:
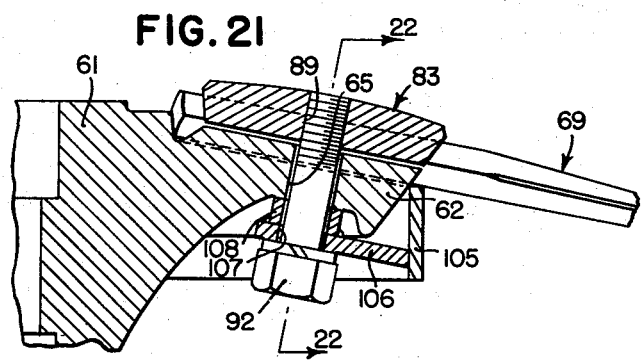

Figure 21 is an enlarged sectional view taken along the line 21—21 of Figure 20.

Figure 22:
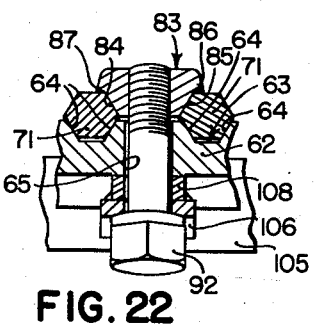

Figure 22 is a sectional view taken along the line 22—22 of Figure 21.

Figure 23:
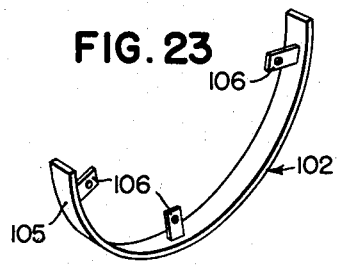

Figure 23 is a perspective view of one of the two half-ring units making up the clod-breaking abutment band.

Referring now to the drawings, the frame of the implement is indicated in its entirety by the reference numeral 1 and may be of any suitable construction including a crossbar 2. Secured to the latter is a shank or standard 3 which includes an upper attaching plate 4 and depending channel sections 5 and 6 suitably secured together, as by welding, so as to form a box section. Disposed within the open end of the latter is a beet wheel spindle unit indicated in its entirety by the reference numeral 9 and including a vertical supporting member 11 shaped to extend within the lower open end of the shank 3 and apertured to receive a pair of mounting bolts 12. The lower end 11a of the supporting member 11 is apertured to receive a pair of downwardly and laterally outwardly and rearwardly (the machine in operation traveling toward the right as viewed in Figure 1) extending wheel spindles 13 having their inner ends fixed into suitable openings 14 formed in the lower end of the support member 11. The lower portion of the spindle shank is provided with an opening 15 leading into the openings which receive the inner ends of the spindles 13. By virtue of the opening 15, access to the inner ends of the spindles 13 is provided so as to permit welding them together and to the lower portion of the spindle shank 11. The latter member is provided with a transverse tapped opening 16 the purpose of which is to receive a pair of stud bolts 17 by which a pair of brace rods 18, connected at their upper ends to the frame 1, are connected to the lower end of the beet wheel shank assembly, the lower portions of the channel 6 having apertures in alignment with the tapped opening 16. In one form of the present invention, the beet wheel spindle shank assembly is made so as to have an angle of 148°30′, being the angle included between the two spindle axes, and the standard and shank construction being such that the transverse plane containing the spindle axes lies at approximately 60° with respect to the longitudinal horizontal plane of the harvester. The transverse plane just mentioned contains the points of minimum and maximum distance between the wheels that are mounted on the spindles, Figure 2 being a section taken along said plane.

The present invention is particularly concerned with the construction and arrangement of the beet-lifting wheels that are mounted on the spindles 13. As best shown in Figure 2, which is a sectional view taken along the transverse plane just mentioned, each beet-lifting wheel includes a cast metal hub member indicated in its entirety by the reference numeral 21 and including a laterally inwardly tapered hub section 22 and laterally outwardly a flange section 23 the outer face of which carries a plurality of radially extending slots or grooves 24, the axes of which lie in a conical surface which tapers inwardly at an angle of about 10° relative to the radial plane of the hub member 21. The latter member is mounted by suitable bearing means on the spindle 13 associated therewith. Any suitable means, such as a nut and washer, carried at the outer end of each spindle 13, serves as means for holding the associated wheel, which is indicated in its entirety by the reference numeral 25, in place on its spindle. Preferably, the laterally outer portion of each of the hub members 21 is closed by a hub cap 27 connected, as by bolts 28, to the outer face of the hub member 21. The latter member carries an annular shouldered abutment 29 at the inner ends of the slots 24.

Disposed in each of the slots 24 of the wheel hub member 21 is a beet-engaging and lifting tooth 31. Preferably, the inner end portion is of square cross section and each tooth is a substantially straight member from one end to the other. The outer or ground-engaging portion of each of the teeth 31 is formed with opposite sides flat, as shown at 32 and 33, the side 33 tapering gradually toward the plane of the side 32 to provide a spade-like or chisel-like formation 34 at the outer end of the tooth, the outer end being relatively thin but of greater width, in a peripheral direction, than the thickness or width of the inner portion of the tooth. In the form of the invention illustrated in Figure 2, for example, the angle between the sides 32 and 33 is approximately 5°.

Figure 3:
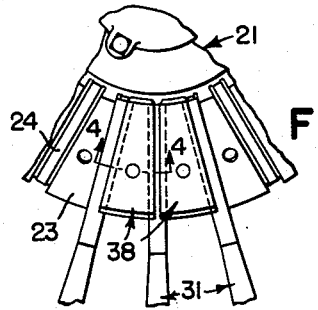
Figure 3 is a fragmentary view showing certain details of the tooth mounting means.

The teeth 31 are fixed in place in the associated slots 24 with the inner ends 35 of the teeth in abutting engagement with the annular shoulder 29 on the wheel hub member 21. For the purpose of securely clamping the teeth to the wheel hub member, the latter is provided with a transverse opening 37 disposed between adjacent slots 24, and a clamping cap or clip 38 is associated with the adjacent side portions of each pair of teeth 31. Each tooth clip or cap 38 comprises a substantially flat tapered member having a central aperture 41 and at each side thereof angularly related grooves 42, spaced apart so as to engage the adjacent portions of the two associated adjacent teeth, as best shown in Figure 4. The opening 41 in each of the clips or caps 38 is tapped; and each of the latter is held in place in the associated slot 24 by a stud bolt 44 extended laterally outwardly through each of the openings 37 of the wheel hub member 21. The several clips or cap members 38 are so dimensioned that opposite edges of each are in close proximity if not in actual contact with the adjacent edges of the nearest companion clips or cap members, as best shown in Figures 1 and 3. The radially inner and outer ends 46 and 47 of each cap member are beveled, the outer beveled edges 47 forming an annular shoulder serving to break up soil moving radially inwardly along the teeth toward the central portion of the wheel.

Figures 6, 7, 8:
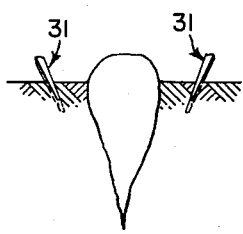

The operation of the beet-lifting wheels of the present invention as so far described is substantially as follows:

The beet harvester in which the principles of the present invention have been incorporated includes means for raising and lowering the wheels 25 into and out of ground-penetrating or operating position. When it is desired to lift beets, preferably beets which have already been topped and the tops, leaves and the like suitably disposed of, the wheels 25 are lowered until the lowermost teeth enter into the ground for several inches, which distance depends upon the size and condition of the beets and other factors. Figure 1, for example, shows the teeth operating at a depth of about five inches. The spindle and shank assembly are so mounted in the machine that, as mentioned above, the transverse plane containing the axes of the spindles 13 occupies a position of about 60° relative to the longitudinal horizontal plane of the harvester, and as also described above, the planes of rotation of the wheels, which may be considered the planes that contains the outermost ends 34 of the sets of teeth 31, are disposed at an angle of about 30° with respect to one another measured in the aforesaid 60° plane. The teeth are arranged so that each tooth makes an angle of about 10° relative to the plane of rotation of the wheel, or about 80° relative to the associated spindle axis, and the angle between opposite teeth at the point of closest approach (Figure 2, lower portion) is about 50°, which is reduced to about 40° when the teeth are reversed as shown in Figure 5, since there is about a 5° angle between opposite sides of each tooth, as mentioned above. These angular relationships are shown in Figures 1 and 2, and by virtue of this construction the points where the outer ends of the teeth first come into contact with the ground are disposed a substantial distance apart, as shown in Figures 6 and 13, sufficient to clear the largest beets to be encountered.

Figures 9, 10, 11, 12:
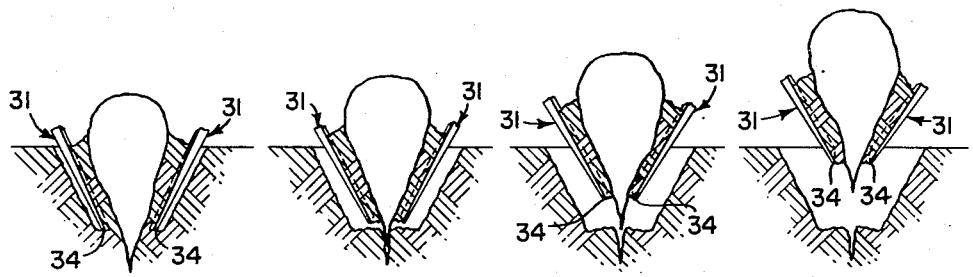

As the wheel rolls forwardly during the forward advance of the machine, which is toward the right as viewed in Figure 1, the portions of each pair of teeth near the surface of the ground approach one another, the rate of approach being fairly slow at first and as the teeth approach the point of their deepest penetration the rate of approach increases. This action is illustrated in Figures 6–13. While the latter figure actually is a sectional view taken at the ground level and looking downwardly on those portions of the teeth of the two wheels which are disposed below the ground level, it may also be considered that each pair of oppositely disposed teeth move successively into the positions shown in Figure 13, going from right to left. Figures 6–12 therefore show successive positions of each pair of teeth as the beet-lifting wheels roll forwardly. For example, considering any one pair of teeth, that is, a tooth on the right-hand wheel and the opposite or cooperating tooth on the left-hand wheel, first enters the ground in about the arrangement and spaced-apart relation shown in Figure 6. As the wheel continues to roll forwardly, the aforesaid pair of teeth then move into the positions shown in Figure 7, and then into the positions shown in Figure 8, etc., and of course progressively into all positions intermediate the aforesaid figures. Attention is particularly directed to the fact that, considering any one pair of teeth, the teeth first contact the ground approximately in the spaced-apart relation and angular positions shown in Figure 6, and that as the wheels continue to move forwardly the teeth are forced substantially directly into the ground without very much laterally inward movement until they reach the position of the teeth indicated at A in Figure 1, which is the position shown in Figure 8. However, due to the particular angular position of the wheel spindles and the angle of the teeth relative to the wheel axis, as will be seen from Figures 6, 7, 8 and 13, the teeth almost from the moment they enter the ground begin to exert some laterally inwardly directed pressure against the soil surrounding the beet and this pressure, applied when the teeth are more nearly vertical than they are later on in their movement, is effective to loosen the beet from the soil even while the teeth themselves are approaching their position of deepest penetration (Figure 9). In thus loosening the beet from the ground before any upward movement of the teeth begins, there is little likelihood that the subsequent lifting action (Figures 10, 11 and 12) will break off the tails of the beets. Then as the teeth move from the position shown in Figure 8 to the position shown in Figure 9 there is a considerable lateral movement of the lower ends of the teeth but still not very much movement of the upper portions of the teeth, that is, the portions at the ground level. The laterally inward movement of the spade-like lower end portions 34 of the teeth, particularly in moving progressively rearwardly from the position shown in Figure 8, serves to shatter and crush the soil around the lower parts of the beet, especially the portions below the widest portion of the beet, whereby any clods are broken up into small fragments, much smaller than the beet itself. Also, beginning at about the position illustrated in Figure 9, as the lower spade-like portions of the pair of teeth approach one another, with the greater amount of laterally inward displacement of one tooth relative to the adjacently opposite tooth occurring below the level of the ground, the beet is subjected to a lifting action which tends to force the beet out of the loosened soil. As the pair of teeth move, for example, from the position shown in Figure 9 to the position shown in Figure 10, the teeth begin their upward and rearward movement which serves not only to continue to force the beet out of the ground but also lifts the same generally vertically by the now upward movement of the teeth. By the time the teeth have reached the position shown in Figure 11, they lie at the point where the tips 34 are closest together, as indicated at x in Figures 1 and 2. However, as the wheels continue to roll forwardly and the teeth move upwardly into a position substantially at the ground level, as shown in Figure 12, the beet therebetween is raised an additional distance, and by this time other beet handling means, such as a paddle wheel mounted between the wheels 25, engage and move the beets generally rearwardly onto a conveyor or the like. For purposes of illustration, the paddle wheel is indicated in Figure 1 by the reference character P and the conveyor at C. During this action, the portions of the soil shattered by the inwardly moving tooth portions fall to the ground through the spaces between the teeth and between the links or slats of the conveyor.

During the beet-lifting operations as just described, the spade- or chisel-like formation of the radially outer ends of the teeth 31 are of special significance. Since the outermost ends of the teeth are of considerably greater peripheral extent than the more inner portions of the teeth, the edge of one tooth makes a fairly small angle relative to the edge of the next adjacent tooth, an angle that is smaller than the angle between the axes of adjacent teeth. As a result of this construction, there is very little tendency for soil to lodge in the spaces between adjacent teeth on each wheel. Further, during the times which the outer ends of the teeth are approaching one another for the purpose of grasping the beet and/or shattering the soil surrounding the beet, the fairly wide tooth portions, which are thus acting laterally, afford a good purchase on the intervening soil portions and insure the fragmentation of any clods and in addition the ejection of the beet body from the soil surrounding it.

Mention was made above of the fact that the teeth 31 are reversible. Figure 2 shows the teeth arranged with their flat sides 32 disposed laterally inwardly, providing the angular relations mentioned above. If it should be desired to have a smaller included angle between opposed pairs of teeth, the teeth 31 are reversed to dispose the inclined sides 33 laterally inwardly. The teeth may, for example, be arranged in this fashion for use in dry or hard ground in which greater crushing forces are desired, thereby assuring the crushing of all clods into fairly small fragments and their elimination from the machine before the beets reach the truck or other receptacle carried by or propelled alongside the harvester to receive the harvested beets. Generally, the teeth are arranged as shown in Figure 2 for operating under wet or mucky ground conditions so as to prevent the soil from packing in between the teeth of the two wheels.

As will be apparent from Figure 2, the radially outwardly facing edge or surface 23a of the wheel hub flange 21 forms an abutment or shoulder against which soil portions, moving inwardly along the teeth 31, may be forced. The shoulder or abutment 23a therefore forms means cooperating with the teeth 31 in further shattering and breaking up clods and the like that may be encountered in the harvesting of beets. These shoulders 23a also aid in holding the ground down in the event the above-mentioned laterally inwardly directed pressure acts to break the ground upwardly instead of loosening the beet from the soil in which it is growing. In some cases, it may be desirable to have a somewhat greater or more vigorous soil shattering or breaking action, and to that end the modified form of the invention described below includes a somewhat different soil-engaging abutment or shoulder.

The modified form of this invention just referred to is shown in Figures 15-22. In this form of the invention the spikes or teeth, while flattened at their radially outer ends, are not formed with planar sides; instead, each of the teeth has a centrally disposed, longitudinally extending rib or ridge, which facilitates breaking the soil and clods into small fragments. Also, in this form of the invention, there is a detachably mounted ring member which serves as a soil breaking abutment which in its action is somewhat more positive than the abutment construction present in the form of the invention shown in Figure 2.

Referring now to Figures 15-22, in this form of the invention the wheel hub 61 is provided with a generally radially extending flange 62 in the laterally outer face of which are a plurality of slots 63, each of which has outwardly diverging side walls 64. Between the slots 63 the hub flange 62 is provided with stud-receiving apertures 65. The slots 63 are arranged radially, like the slots 24 described above and in about the same angular disposition, relative to the wheel spindles, as the latter slots.

The tooth construction in this form of the invention is substantially like that described above in that opposite sides of each tooth are flattened and the side edges of each tooth are flared outwardly toward the square end of the tooth in diverging relation. In this form of the invention each tooth is indicated by the reference numeral 69 and is shown in detail in Figures 16 and 17. Each tooth 69 has a wheel-receiving section 71 that is generally hexagonal in cross section, as shown in Figure 18, and radially outwardly of the hexagonal section 71 each tooth is flattened and formed so that the opposite side edges 72 and 73 (Figures 16 and 17) diverge radially outwardly, terminating in a square end 74 which, as best shown in Figure 19, is generally of flattened diamond shape. The flattened opposite edges of the radially outer portion of each tooth are formed generally like the sides 32 and 33 of the tooth 31 described above; that is, one side, indicated at 76, is substantially straight and co-linear with the wheel-receiving portion 71 of the tooth while the other side 77 lies at a slight angle with respect to the longitudinal axis of the tooth. Also, in this tooth construction, each flattened side includes a rib or ridge, the side 76 of the tooth having a rib or ridge 78 while the other side 77 of the tooth has a rib or ridge 79. The teeth 69 are reversibly mounted in the slots 63 for the same reason as described above in connection with the tooth construction 31. A plurality of clamping caps 83 are provided for fixing the tooth 69 to the wheel hub 61. Each clamping cap is provided with laterally outwardly diverging wall sections 84 and 85 and cooperating overhanging portions 86 and 87. The wall portions 84 and 85 are angled so as to fit against the adjacent angled walls of the associated hexagonal tooth portions 71, as best shown in Figure 22. Centrally each clamping cap 83 is drilled and tapped, as at 89, to receive the threaded end of a stud bolt 92 which extends through the associated aperture 65 in the wheel hub 61 and operative when tightened to securely clamp the cap 83 against the sides of the two adjacent teeth 69, as shown in Figure 22.

Inasmuch as the flattened opposite sides of the teeth 69 are provided with ribs or ridges 78 or 79, as mentioned above, this form of tooth construction is particularly adapted to operate under conditions where it is essential to break up the soil into small fragments, and to this end this form of the invention includes a soil shattering abutment member 100 which is somewhat more vigorous in its action than the abutment structure described above in connection with the form of the invention shown in Figures 1-5. The soil shattering unit 100 preferably is in the form of a ring member made up of two identical sections indicated at 101 and 102 in Figure 15, the section 102 being shown in perspective in Figure 23. Each of the ring sections 101 and 102 includes a semi-circular band 105 having generally radially inwardly extending lugs 106 welded to the inner surface of the band 105 at circumferentially spaced apart points. Each lug 106 is apertured, as at 107, to receive one of the stud bolts that fix the tooth clamping members 83 to the wheel hub. Secured to each apertured lug 106 is a spacer 108, preferably welded thereto in alignment with the aperture 107. The function of the spacers 108 is to allow the lug 106 to clear adjacent portions of the wheel hub, as best shown in Figure 21. From this figure it will also be seen that the bands 105 are disposed in concentric relation with respect to the wheel hub 61 and that the width of the bands 105 is somewhat greater than the adjacent shouldered portion of the wheel hub. Therefore, in this form of the invention, any soil portions that are forced radially inwardly along the teeth 69 will come up against the abutment structure 105 and be broken up into small fragments.

Except for the distinctions noted above, the function and operation of a beet lifting wheel as just described is substantially the same as the function and operation of the beet lifting wheel structure shown in Figures 1–5 and further description of the operation is unnecessary.

While we have shown and described above, the preferred structure in which the principles of the present invention may be incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. In a beet harvester or the like having a frame, a standard carried thereby, a pair of generally laterally outwardly and downwardly extending spindles fixed in generally opposed relation to the lower end of the standard, a wheel hub rotatably mounted on each spindle, each wheel hub having a plurality of generally radially extending slots, a plurality of soil-entering teeth carried in said slots, a plurality of cap members for fixing said teeth to said wheel hub, each cap member having a pair of oppositely disposed tooth-engaging portions adapted to engage the adjacent edges of the teeth at opposite sides of said cap member, and means for fixing each cap member to the wheel hub between two contiguous teeth.

2. In a beet harvester or the like having a frame, a generally vertical standard carried thereby, a pair of generally laterally outwardly and downwardly extending spindles fixed in generally opposed relation to the lower end of the standard, a wheel hub rotatably mounted on each spindle, each wheel hub having a plurality of generally radially extending slots, and an annular shoulder at the inner ends of said slots extending generally axially outwardly beyond the inner ends of said slots, a plurality of soil-entering teeth carried in said slots with their inner ends disposed against said shoulder, and means for fixing said teeth in said slots including a plurality of caps, each disposed between and engaging the sides of adjacent teeth, said caps being dimensioned so as to substantially meet over the outer faces of said teeth, thereby forming an annular shoulder serving to break up soil moving radially inwardly along said teeth toward the center of the wheel.

3. The invention set forth in claim 1, further characterized by each of said slots and the associated caps having laterally outwardly diverging side walls, and each of said teeth having side portions adapted to be wedgingly engaged by the divergingly arranged side walls of the associated slots and caps.

4. In a beet harvester or the like having a frame, a generally vertical standard carried thereby, a pair of generally laterally outwardly and downwardly extending spindles fixed in generally opposed relation to the lower end of the standard, a wheel hub rotatably mounted on each spindle, each wheel hub having a plurality of generally radially extending slots, a plurality of soil-entering teeth carried in said slots, a plurality of cap members for fixing said teeth to said wheel hub, the generally radially outer end of said cap members projecting generally axially with respect to the wheel hub for forming a generally annular shoulder to break up soil moving radially inwardly along said teeth, said wheel hub having a radial flange in which said slots are formed, and said flange being formed with an annular shouldered portion lying generally axially inwardly of said teeth to cooperate with said first mentioned annular shoulder for breaking up soil moving generally radially inwardly along said teeth.

5. The invention set forth in claim 4, further characterized by said second shoulder comprising a detachable ring, and means for securing said ring to said hub.

6. The invention set forth in claim 4, further characterized by said second shoulder comprising a detachable ring, and means whereby said ring is held on said hub by the means fixing said teeth in said slots.

7. The invention set forth in claim 1, further characterized by a soil-breaking ring member attachable to said hub adjacent the radially outer ends of said slots, and lugs on said ring member adapted to receive the means fixing the cap members to said hub, for fixing said ring member to said wheel hub.

8. In a beet harvester or the like having a frame, standard means carried thereby, a pair of spindles fixed to said standard means, the axes of said spindles extending generally laterally outwardly, downwardly and rearwardly in generally opposed relation, said spindles being disposed relative to one another at an included angle of about 150° and the plane containing the spindle axes lying at about 60° relative to the longitudinal plane of said frame, and a rotary lifting wheel mounted on each of said spindles, each of said lifting wheels having generally radially outwardly extending teeth that are generally straight and lie at an angle of about 80° relative to the axis of rotation of said wheel, the teeth of each wheel lying in a generally conical surface the apex of which extends laterally outwardly, the aforesaid spindle and tooth axes and the aforesaid forward angle of the plane containing said spindle axes being such that, in an operating position, the lateral distance along the ground between the points where the outer ends of opposite disposed teeth start to enter the ground is substantially not less than the distance between the points of intersection of said teeth and the surface of the ground at any subsequent position of the teeth until they emerge from the ground, the distance between the ground-intersecting points on a pair of opposite teeth progressively decreasing at an increased rate as the teeth approach their point of deepest penetration, and the angle between a pair of opposite teeth after they first enter the ground and move downwardly below the wider portion of the adjacent beet to their deepest penetration being from about 40° to about 60°, whereby the movement of opposite teeth toward one another, during the time from shortly after the teeth penetrate the ground to the time the teeth reach their deepest penetration, loosens the beet and beet root from the soil before the teeth begin to move upwardly beyond their points of deepest penetration.

9. The invention set forth in claim 8, further characterized by said standard means including a generally vertical shank to which the laterally inner ends of said spindles are fixed so that said spindles extend laterally outwardly, downwardly and rearwardly from the lower end of said shank.

10. The invention set forth in claim 8, further characterized by a generally radially outwardly facing abutment shoulder carried by each wheel disposed on the laterally inner side of said wheel and extending laterally inwardly of the inner faces of said teeth a substantial distance so as to tend to hold down soil during the time the teeth are approaching one another during the forward rotation of the wheels in operation.

11. The invention set forth in claim 8, further characterized by each of said teeth having generally flattened laterally inner and outer faces, the edges of which are substantially straight from points closely adjacent the hub radially outwardly to the end of the tooth and diverge generally radially outwardy, forming relatively wide soil- and beet-engaging faces and relatively narrow soil-entering portions adapted to be forced into the soil during rotation of the beet-lifting wheel in digging position.

12. The invention set forth in claim 8, further characterized by opposite sides of each of said teeth making a small angle with respect to one another, and means reversibly connecting said teeth to the associated wheel hub, whereby the angle between the lowermost teeth of one set and the corresponding lowermost teeth of the other set may be changed.

References Cited in the file of this patent

UNITED STATES PATENTS

| Number | Name | Date |
|---|---|---|
| 430,330 | Ayres | June 17, 1890 |
| 704,519 | Culbertson | July 15, 1902 |
| 1,435,569 | Wilson | Nov. 14, 1922 |
| 1,620,019 | Hammer et al. | Mar. 8, 1927 |

FOREIGN PATENTS

| Number | Country | Date |
|---|---|---|
| 22,103 | Sweden | Dec. 30, 1905 |